(12) United States Patent
Natanael et al.

(10) Patent No.: US 7,448,455 B2
(45) Date of Patent: Nov. 11, 2008

(54) TURBODRILL WITH ASYMMETRIC STATOR AND ROTOR VANES

(75) Inventors: Mark Natanael, Houston, TX (US); Kenneth M. Nevlud, Houston, TX (US); Timothy P. Beaton, The Woodlands, TX (US); James Beylotte, Houston, TX (US)

(73) Assignee: Smith International, Inc., Houston, TX (US)

( * ) Notice: Subject to any disclaimer, the term of this patent is extended or adjusted under 35 U.S.C. 154(b) by 280 days.

(21) Appl. No.: 11/266,995

(22) Filed: Nov. 4, 2005

(65) Prior Publication Data

US 2006/0090936 A1      May 4, 2006

(51) Int. Cl.
E21B 4/02          (2006.01)
(52) U.S. Cl. ........................................... 175/107
(58) Field of Classification Search ................ 175/107; 415/903
See application file for complete search history.

(56) References Cited

U.S. PATENT DOCUMENTS 3,583,502 A * 6/1971 Henderson ................... 175/107
4,676,716 A * 6/1987 Brudny-Chelyadinov et al. ............................ 415/144

FOREIGN PATENT DOCUMENTS

EP      0671563 A1      9/1995

OTHER PUBLICATIONS

Combined Search and Examination Report issued in corresponding British Application No. GB0618338.8; Dated Jan. 11, 2007; 6 pages.

* cited by examiner

*Primary Examiner*—Hoang Dang
(74) *Attorney, Agent, or Firm*—Osha • Liang LLP

(57) ABSTRACT

A turbodrill has rotor vanes and stator vanes that are asymmetric with respect to each other. The rotor blade on which the rotor vanes are disposed has a reaction of less than about 0.5. A method of designing a turbodrill comprises optimizing a first design of stator vanes and optimizing a second design of rotor vanes using computational fluid analysis.

16 Claims, 6 Drawing Sheets

TURBODRILL WITH ASYMMETRIC STATOR AND ROTOR VANES

BACKGROUND OF INVENTION

1. Field of the Invention

The invention relates generally to motors attached to a drill string and used for drilling an earth formation. More specifically, the invention relates to a turbine motor powered by the flow of drilling fluid.

2. Background Art

Drilling motors are commonly used to provide rotational force to a drill bit when drilling earth formations. Drilling motors used for this purpose are typically driven by drilling fluids pumped from surface equipment through the drill string. This type of motor is commonly referred to as a mud motor. In use, the drilling fluid is forced through the mud motor(s), which extract energy from the flow to provide rotational force to a drill bit located below the mud motors. There are two primary types of mud motors: positive displacement motors ("PDM") and turbodrills.

A PDM is based on the Moineau principle. Drilling fluid is forced through a stator. An eccentric rotor is located inside the stator. Drilling fluid circulating through the stator imparts a rotational force on the rotor causing it to rotate. This rotational force is transmitted to a drill bit located below the PDM.

A turbodrill uses one or more stages to provide rotational force to a drill bit. A typical prior art turbodrill is shown in FIG. 1. In FIG. 1, a turbodrill 8 is connected to a drill string 4. A drill bit 3 is connected to a shaft 1 on a lower end of the turbodrill 8. In operation, drilling fluid (not shown) is pumped through the drill string 4 until it enters the turbodrill 8. The flow path of the drilling fluid through the turbodrill 8 is indicated by arrows. When the drilling fluid enters the turbodrill, the flow is substantially in the axial direction in line with the axis -A- of the turbodrill 8. The drilling fluid is diverted from the center of the turbodrill 8 to an outer radial position of the turbodrill 8. The drilling fluid then passes through a stator 6, which is rotationally fixed relative to the housing 2 and the drill string 4. A plurality of curved stator vanes 9 are positioned around stator 6. As the drilling fluid passes through the stator 6, it accelerates and the flow direction is changed by a selected angle, which is typically referred to as the swirl angle. The resulting flow direction is helical with respect to the axis -A-.

After passing through the stator 6, the drilling fluid passes through the rotor 7. A plurality of curved rotor vanes 10 are positioned around the rotor 7. The rotor vanes 10 are curved to direct flow in an opposing direction to the helical flow resulting from the stator 6. The rotor vanes 10 are shaped similarly to an airfoil so that the drilling fluid passes efficiently through the rotor 7. The energy required to change the rotational direction of the drilling fluid is transformed into rotational and axial (thrust) force. This energy transfer is seen as a pressure drop in the drilling fluid. The thrust is typically absorbed by thrust bearings (not shown). The rotational force causes the rotor 7 to rotate relative to the housing 2. The rotor 7 rotates the shaft 1, which may be connected to a drill bit 3.

FIG. 1 also illustrates the use of multiple "stages" in a turbodrill 8. A stage includes a stator blade 9 and a rotor blade 10, each having an arrangement of blades thereon. The rotor blades 10 of each stage are typically attached to the same rotor 7. Each stage generates an amount of power and torque, and results in a corresponding pressure drop for a given flow rate. Multiple stages are stacked coaxially until the desired power and torque is achieved. Because a pressure drop results from each stage, the total pressure drop must be considered based on the pumping ability of the pumps (not shown) used to convey the fluid downhole. The stacking of stages also increases the overall length of the tool.

What is still needed are improved turbodrills. Desired improvements may include shorter length, increased efficiency, lower axial thrust, power curves with wider operating regions, and the ability to be used with mud of various density and viscosity.

SUMMARY OF INVENTION

In one aspect, the present invention relates to a turbodrill having a connection on an upper end adapted to connect to a drill string and a connection on a lower end adapted to connect to a drill bit. At least one stage having a stator blade and rotor blade is disposed in the turbodrill. The stator blade has a plurality of stator vanes spaced around a circumference of the stator blade. The rotor blade has a plurality of rotor vanes spaced around a circumference of the rotor blade. The stator vanes and rotor vanes are asymmetric relative to each other. A reaction of the rotor blade is less than about 50 percent.

In another aspect, the present invention relates to a method of designing a turbodrill having a plurality of stages, each stage having a plurality of stator vanes and a plurality of rotor vanes, wherein the stator vanes and the rotor vanes are asymmetric relative to each other. The method preferably includes optimizing a first design of the stator vanes using computational fluid analysis. The method also preferably includes optimizing a second design of the rotor vanes using computational fluid analysis.

In another aspect, the present invention relates to a turbodrill having a connection on an upper end adapted to connect to a drill string and a connection on a lower end adapted to connect to a drill bit. The turbodrill is a direct drive turbodrill having at least one stage. The at least one stage includes a stator blade having a plurality of stator vanes spaced around a circumference of the stator blade and a rotor blade having a plurality of rotor vanes spaced around a circumference of the rotor blade, wherein the stator vanes and rotor vanes are asymmetric relative to each other. Each stage has an operating pressure drop of at least about 25 psi.

In another aspect, the present invention relates to a turbodrill having a connection on an upper end adapted to connect to a drill string and a connection on a lower end adapted to connect to a drill bit. The turbodrill is a direct drive turbodrill having less than 57 stages. Each stage includes a stator blade having a plurality of stator vanes spaced around a circumference of the stator blade and a rotor blade having a plurality of rotor vanes spaced around a circumference of the rotor blade, wherein the stator vanes and rotor vanes are asymmetric relative to each other.

Other aspects and advantages of the invention will be apparent from the following description and the appended claims.

DETAILED DESCRIPTION

In one aspect, the present invention relates to methods for improving drilling performance and turbodrills having improved drilling performance.

As discussed above, the primary role of the stator is to swirl the drilling fluid prior to entering the rotor. At the same time, the pressure drop across the stator should be minimized because it increases the pressure required to pump the drilling fluid. Because the stator is rotationally fixed relative to the housing of the turbodrill, any rotational force generated is absorbed by the housing and wasted.

The primary role of the rotor is to transform the energy of the drilling fluid into rotational energy for rotating the drill bit. This is achieved by changing the direction of the fluid flow. The force required to turn the fluid causes a reaction force on the rotor vanes causing them to turn the rotor.

Figure 1:
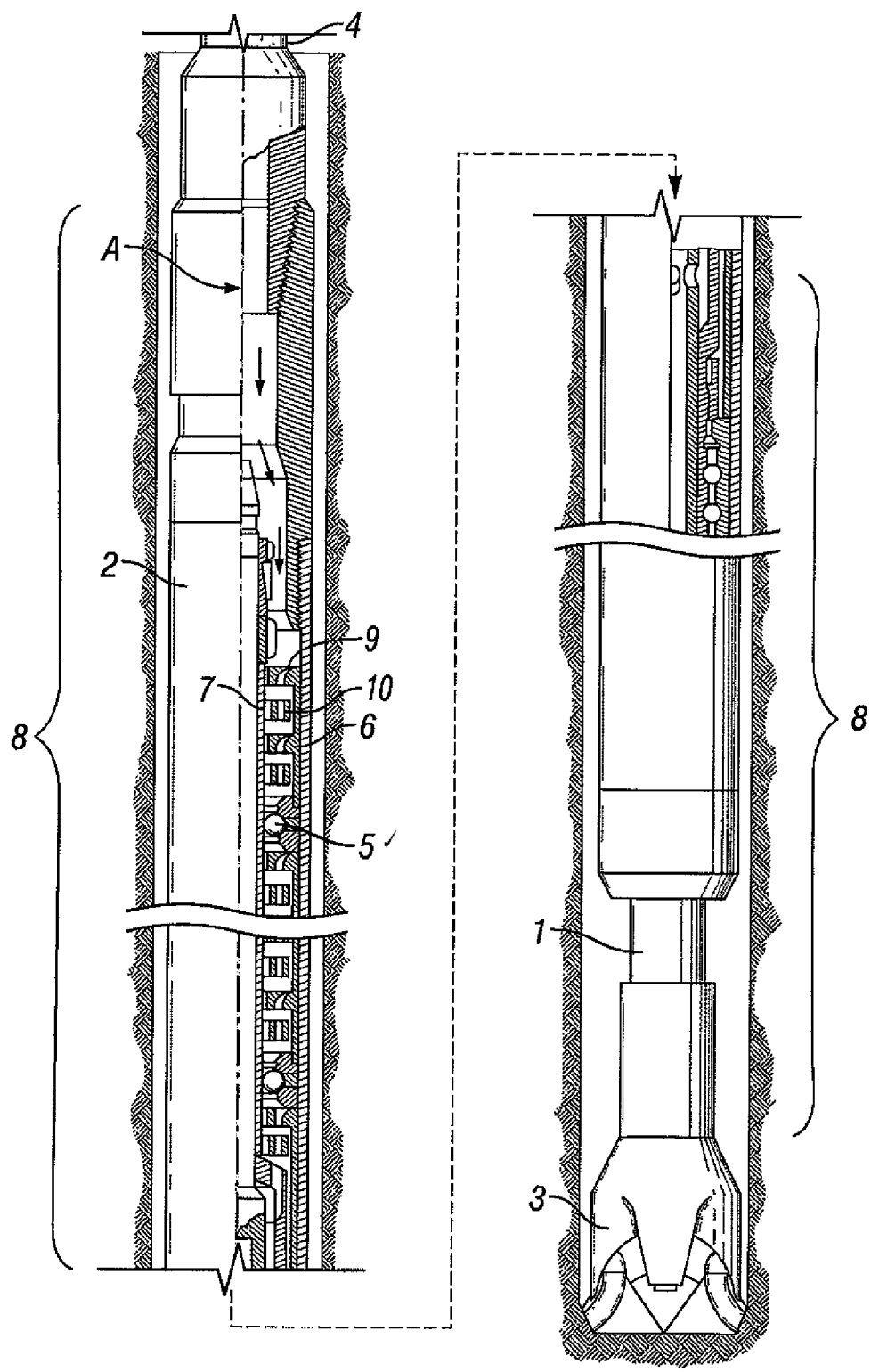
FIG. 1 shows a partial cross section of a prior art turbodrill attached to a drill string and drill bit.
Figure 2:
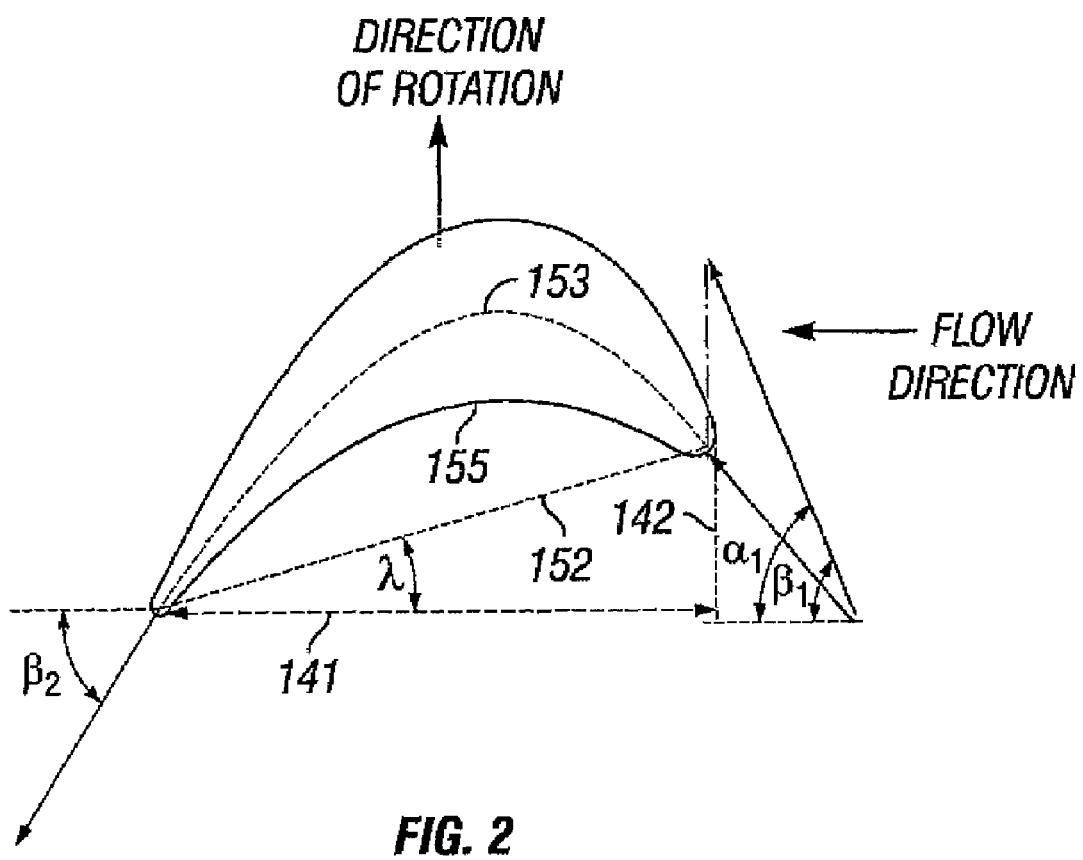
FIG. 2 shows a profile of a rotor vane in accordance with an embodiment of the present invention.

FIG. 2 illustrates certain aspects of rotor and stator vane design. In FIG. 2, a cross section of a rotor vane 155 in accordance with an embodiment of the invention is shown. Two important angles in viewing the geometry of a rotor vane are β1 and β2. The design of the stator vane typically uses the same angle definitions. β1 is defined as the inlet angle of the rotor vane 155. As used herein, the inlet angle refers to the angle between the tangent at the inlet of the mean camber line 153 relative to a line parallel to the axis of the turbodrill. β2 is the outlet angle of the rotor vane 155. As used herein, the outlet angle refers to the angle between the tangent at the outlet of the mean camber line 153 relative to a line parallel to the axis of the turbodrill. These two angles, β1 and β2, are important factors in the performance of the rotor vane because they determine the change in the direction of the drilling fluid passing through the rotor blade. As a general rule, in embodiments of the present invention, β1 plus β2 is preferably less than 120 degrees to avoid excessive blade turning, which can damage the rotor vanes.

Figure 3A:
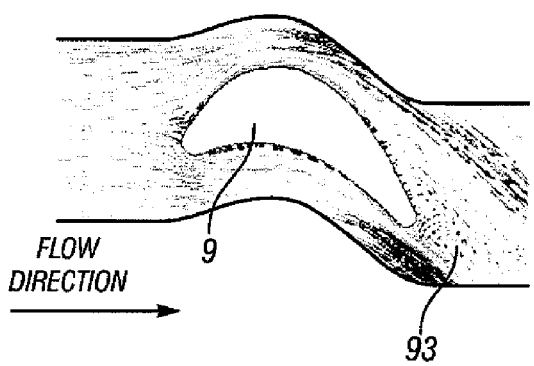
FIG. 3A shows a profile of a prior art stator vane.
Figure 3B:
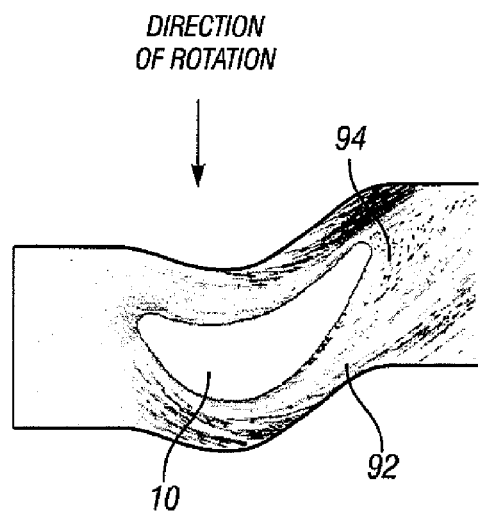
FIG. 3B shows a profile of a prior art rotor vane matching the stator vane in FIG. 3A.

FIGS. 3A and 3B are cross sections of a prior art stator vane 9 and a prior art rotor vane 10, respectively. As is typical of prior art turbodrills, the stator vane 9 and rotor vane 10 are mirror images of each other. This relationship is thought to provide good performance. The present inventors have discovered, however, that the mirror image approach to stator and rotor vanes may not provide the best performance for a turbodrill. As discussed previously, the stator blade determines the swirl angle of the drilling fluid before it enters the rotor blade. To determine the desired swirl angle, the expected rotational speeds (RPM) of the rotor, flow rates of the drilling fluid, and inlet angle β1 of the rotor should be examined in accordance with some embodiments of the present invention. Thus, in one embodiment of the present invention, the effect of using asymmetric blades and/or modifying inlet and outlet flow angles was studied.

Figure 4A:
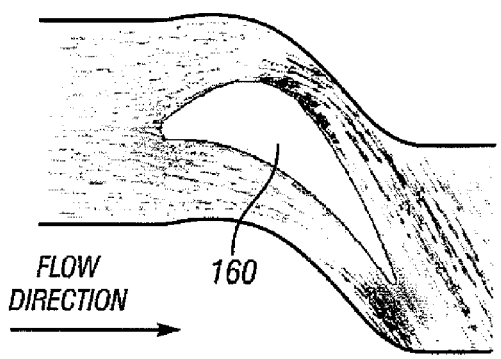
FIG. 4A shows a profile of a stator vane in accordance with an embodiment of the present invention.
Figure 4B:
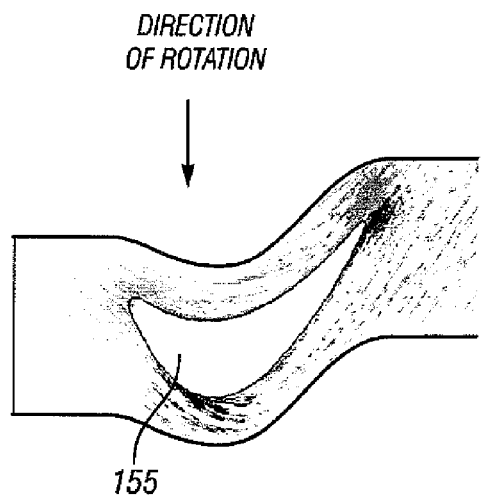
FIG. 4B shows a profile of a rotor vane matching the stator vane in FIG. 4A in accordance with an embodiment of the present invention.

Turning to FIGS. 4A and 4B, cross sections of a stator vane 160 and rotor vane 155, respectively, are shown in accordance with an embodiment of the present invention. A comparison of FIGS. 3A and 3B with FIGS. 4A and 4B is useful for observing the advantages of having asymmetry between the stator vanes and rotor vanes. The images in these figures are generated from computational fluid analysis, which may be performed using commercially available programs such as Blade-Gen™ sold by ANSYS, Inc. (Canonsburg, Pa.). The analysis takes into account the rotation of the rotor vane and the velocity of the drilling fluid. The short line segments in the figures represent the fluid movement from left to right of the figures. Where the short line segments are concentrated to form a darker portion, a relatively higher velocity is indicated.

Based on the stator vane 160 designed in accordance with an embodiment of the present invention, the fluid exiting from the stator vane 160 in FIG. 4A more closely matches the inlet angle β1 of the rotor vane 155 in FIG. 4B. This helps to avoid an abrupt direction change of the fluid, which can result in the fluid separation 92 on the rotor vane 10 in FIG. 3B. Fluid separation 92 results in energy losses that increase the load on the pumps, while not providing rotational force to rotate the rotor. Fluid separation also occurs at the trailing edges 93 and 94 of the stator vane 9 and rotor vane 10, respectively.

Figure 5A:
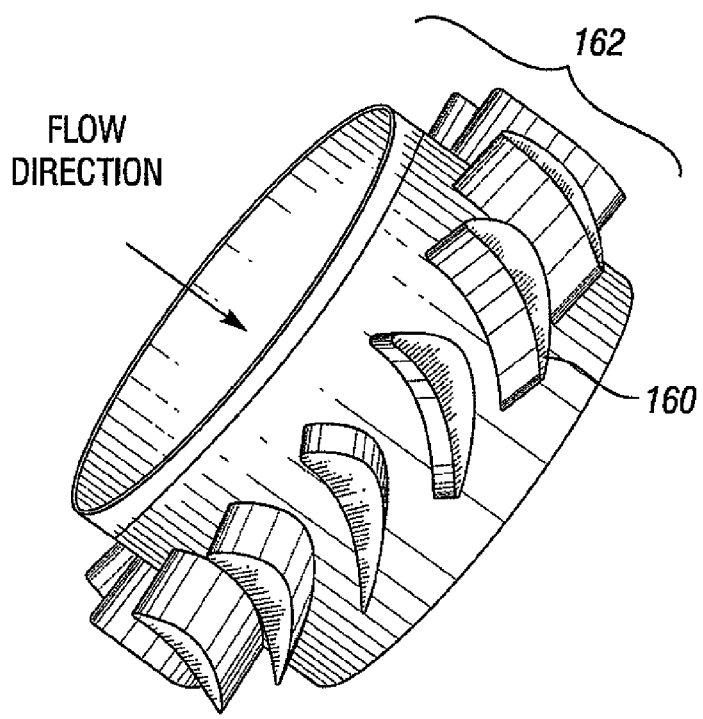
FIG. 5A shows a stator blade in accordance with an embodiment of the present invention.
Figure 5B:
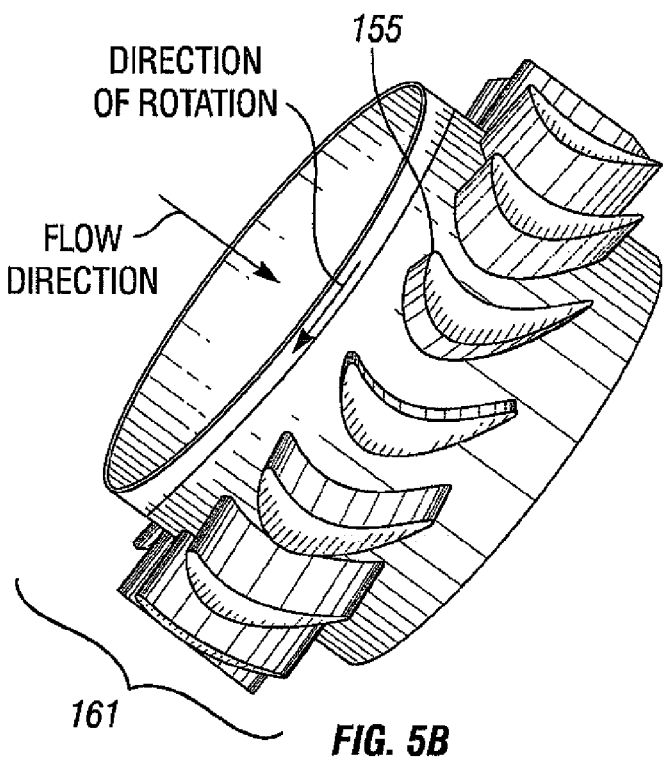
FIG. 5B shows a rotor blade matching the stator blade of FIG. 5A in accordance with an embodiment of the present invention.

FIGS. 5A and 5B show a stator blade 162 and rotor blade 161, respectively, in accordance with an embodiment of the present invention. The stator blade 162 includes a plurality of stator vanes 160 spaced around the circumference. The rotor blade 161 includes a plurality of rotor vanes 155 spaced around the circumference. The spacing of the blades on each section is typically substantially even because of the balanced performance that symmetry provides. A stator blade 162 and rotor blade 161 is combined to form a stage. A turbodrill designed in accordance with embodiments of the present invention may have one or more stages. The stator blade 162 may be rotationally fixed relative to the housing of the turbodrill. The rotor blade 161 may be attached to the shaft so that forces generated by the rotor blade 161 are transferred to the shaft.

As previously discussed, the inlet angle β1 and outlet angle β2 are the core variables used in selected embodiments to determine the geometry of the profile of the rotor vane. The remaining geometry is typically a function of these angles. The following turbomachinery equations may be used to calculate β1 and β2.

$$U = \left(\frac{r_{\text{rms}}}{12}\right) * \left(N \frac{\pi}{30}\right) \quad \text{Equation 1}$$

$$r_{\text{rms}} = \sqrt{\frac{r_{tip}^2 + r_{hub}^2}{2}} \quad \text{Equation 2}$$

$$C_m = \frac{m}{\rho A} \quad \text{Equation 3}$$

-continued $$hp_{stg} = \frac{m * U * C_m(\tan\beta_1 + \tan\beta_2)}{550 * g}$$ Equation 4

Where: $U$ = tangential wheel speed [ft/sec]
$r_{rms}$ = radius at root mean square [in]
$N$ = RPM
$C_m$ = axial speed of the fluid flow [ft/sec]
$\rho$ = fluid density [$lbm/ft^3$]
$A$ = flow area [$ft^2$] through the rotor
blade = $\frac{\pi}{144} * (r_{tip}^2 - r_{hub}^2)$ An equation for β2 can be derived from the $hp_{stg}$ equation as shown below.

$$\beta_2 = \tan^{-1}\frac{550 * g * hp_{stg}}{m * U * C_m} - \tan\beta_1$$ Equation 5

The "reaction" of the stage is defined as the percentage of static pressure drop occurring in the rotor. A higher reaction typically increases the thrust created by the rotor vane, which must then be absorbed by thrust bearings. In the prior art, the reaction is typically 50 percent. In embodiments of the present invention, blades and blade assemblies are designed such that the reaction is less than 50 percent. In some embodiments, the reaction is 10 to 40 percent. In other embodiments, the reaction may be 20 to 35 percent. The reaction of a stage may be calculated using the following equation.

$$R = \frac{C_m}{2U}(\tan\beta_2 - \tan\beta_1)$$ Equation 6

Solving for $\beta_2$ results in the following equation.

$$\beta_2 = \tan^{-1}\left(\frac{2 * U * R}{C_m} + \tan\beta_1\right)$$ Equation 7

Equations 5 and 7 can be combined to solve for $\beta_1$ to yield the following equation.

$$\beta_1 = \tan^{-1}\left(\frac{550 * g * hp_{stg}}{2mC_m * U} - \frac{U - R}{C_m}\right)$$ Equation 8

Figure 6:
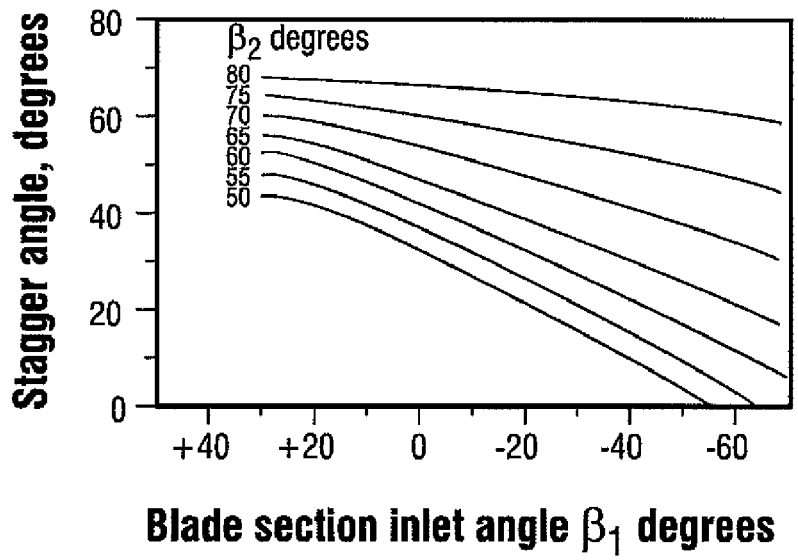
FIG. 6 shows a chart for calculating a stagger angle of a blade.

After calculating $\beta_1$ and $\beta_2$, a stagger angle λ can be determined. The stagger angle λ is shown in FIG. 2. It is the angle between the chord 152 and the axial chord (i.e. axial blade length) 141. To calculate the stagger angle λ, a chart may be used, such as that provided in "The Design of High Efficiency Turbomachinery and Gas Turbines" by David Wilson. Such a chart is shown as FIG. 6. After determining the stagger angle λ, the ideal length of the chord 141 (see FIG. 2) can be calculated based on the angle and the desired axial length of the rotor vane. The tangential chord 142 (see FIG. 2) length may also be calculated from the stagger angle λ and desired axial length of the rotor vane.

With the basic profile of the rotor vane determined, the stator exit angle may be calculated. In embodiments of the present invention, the stator exit angle may be selected to be substantially similar to the rotor inlet swirl angle $\alpha_1$ (see FIG. 2), which is the effective inlet angle derived from the rotor inlet angle $\beta_1$ and the direction of the fluid calculated from the desired rotational speed U of the rotor and the axial speed $C_m$ of the fluid. The equation for calculating $\alpha_1$ is shown below.

$$\alpha_1 = \tan^{-1}\left(\frac{C_m\tan\beta_1 + U}{C_m}\right)$$ Equation 9

With the profiles of the stator and rotor vanes defined, an optimum number of blades per stator and rotor may be determined by means of a calculation. To perform this calculation, a Zweifel coefficient $\Psi_T$ is selected. Those having ordinary skill in the art will appreciate that the typical value for the Zweifel coefficient $\Psi_T$ is assumed to be between 0.5 and 1.2. The equation for calculating the number of blades $N_B$ per rotor and stator is shown below. While it is common to have the same number of blades per rotor and stator, one of ordinary skill in the art will appreciate that the number of blades between the rotor and stator may vary without departing from the scope of the invention, especially when embodiments use asymmetric rotors and stators.

$$N_B = \frac{4\pi r_{rms} * \cos^2\beta_2(\tan\beta_1 + \tan\beta_2)}{\Psi_T * c}$$ Equation 10

Where: c=chord length [in]

The present inventors have discovered that an important variable in rotor vane design is the aspect ratio of the blade. As used herein, the aspect ratio refers to the ratio of the blade height to the axial chord. As used herein, "blade height" refers to the distance between the hub radius and the tip radius of the blade. Typically, prior art rotor vanes have an aspect ratio of 0.5. It has been found that energy losses my be reduced (to increase performance) by increasing the aspect ratio of the stator and/or rotor vanes. In some embodiments of the present invention, aspect ratios of 0.7 to 1.5 may be used for the stator and/or rotor vanes. In other embodiments, aspect ratios of 0.9 to 1.1 may be used for the stator and/or rotor vanes. One of ordinary skill in the art will appreciate that other aspect ratios may be selected without departing from the scope of the present invention.

In general, prior art turbodrills have rotor vanes that are mirror images of the stator vanes (i.e. the stator vanes and the rotor vanes are symmetric). As a result of the symmetry, in the prior art, the rotor blade and the stator blade have about the same reaction, which is typically about 50 percent on each of the rotor blade and the stator blade in the prior art. In some embodiments of the present invention, the reaction of the stator blade is greater than the reaction of the rotor blade. In one embodiment, the reaction of the stator blade may be between about 80 percent and 65 percent while the reaction on the rotor blade is between about 20 percent and 35 percent. Axial thrust resulting from the reaction on the stator blade is absorbed by the housing of the turbodrill, thereby not affecting the rotation of the shaft. Axial thrust resulting from the reaction on the rotor blade is typically absorbed by thrust bearings. By significantly reducing the amount of axial thrust absorbed by the thrust bearings, the friction in the thrust bearings can be reduced, thereby decreasing resistance to rotation of the shaft and increasing the efficiency of the turbodrill as a whole.

Another aspect to the design of stages for a turbodrill is the stagger angle ratio. As used herein, the "stagger angle ratio"

is the ratio between the stagger angle of the stator vanes in a stator blade to the rotor vanes in a rotor blade. In prior art stages, which are typically symmetric, the stagger angle ratio is about 1:1. In some embodiments of the present invention, the stagger angle ratio may be between about 2:1 to 3:1. In one embodiment, the stagger angle ratio may be 2.5:1.

Those having ordinary skill in the art will appreciate that the present invention may be used with both "direct drive" and geared turbodrills. Some turbodrills have gearing between the rotor and the shaft connected to the drill string. The gearing may be used to increase the power and torque capability of the turbodrill. Turbodrills that have direct linkages between the rotor and the shaft are said to be "direct drive" turbodrills.

In the prior art, direct drive turbodrills have 75 or more stages to achieve the desired power and torque output. Such a direct drive turbodrill would typically have an operating pressure drop of less than 1825 psi, or about 24.3 psi per stage. To achieve a shorter turbodrill in the present invention, the number of stages may be reduced by increasing the pressure drop through each stage, which can provide a greater power and torque output per stage. For example, in one embodiment, the turbodrill may be a direct drive turbodrill having less than 75 stages and an operating pressure drop of at least 1850 psi, or about 25 psi per stage. In another embodiment, the turbodrill may be a direct drive turbodrill less than 75 stages and an operating pressure drop between about 1850 psi and 2400 psi. In another embodiment, the turbodrill may be a direct drive turbodrill having less than 90 stages and an operating pressure drop greater than about 2400 psi, or about 27 psi per stage. In another embodiment, the operating pressure drop may be greater than about 30 psi per stage. In another embodiment, the turbodrill may be a direct drive turbodrill having less than 57 stages.

Embodiments of the present invention may provide one or more of the following advantages. The extent to which efficiency may be improved using embodiments of the present invention is particularly surprising. Lab tests have shown that a turbodrill can exhibit efficiency improvements over prior art turbodrills of about 20 percent with stages designed in accordance with embodiments of the present invention.

Figure 7A:
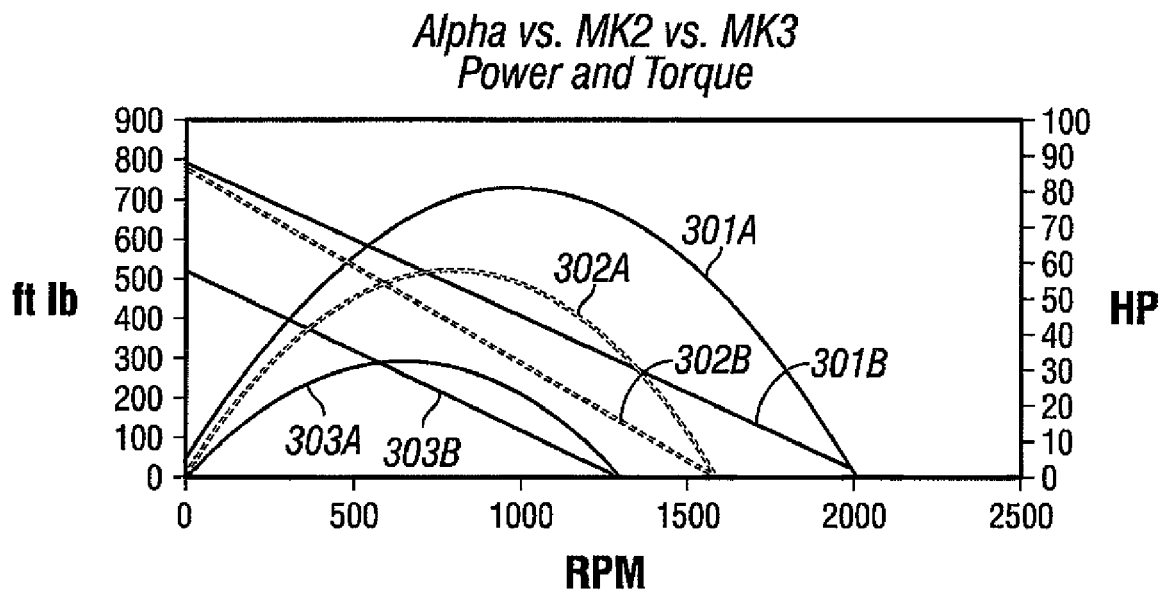
FIG. 7A shows a chart of power and torque versus rotational speed for two prior art stages compared to a stage in accordance with an embodiment of the present invention.
Figure 7B:
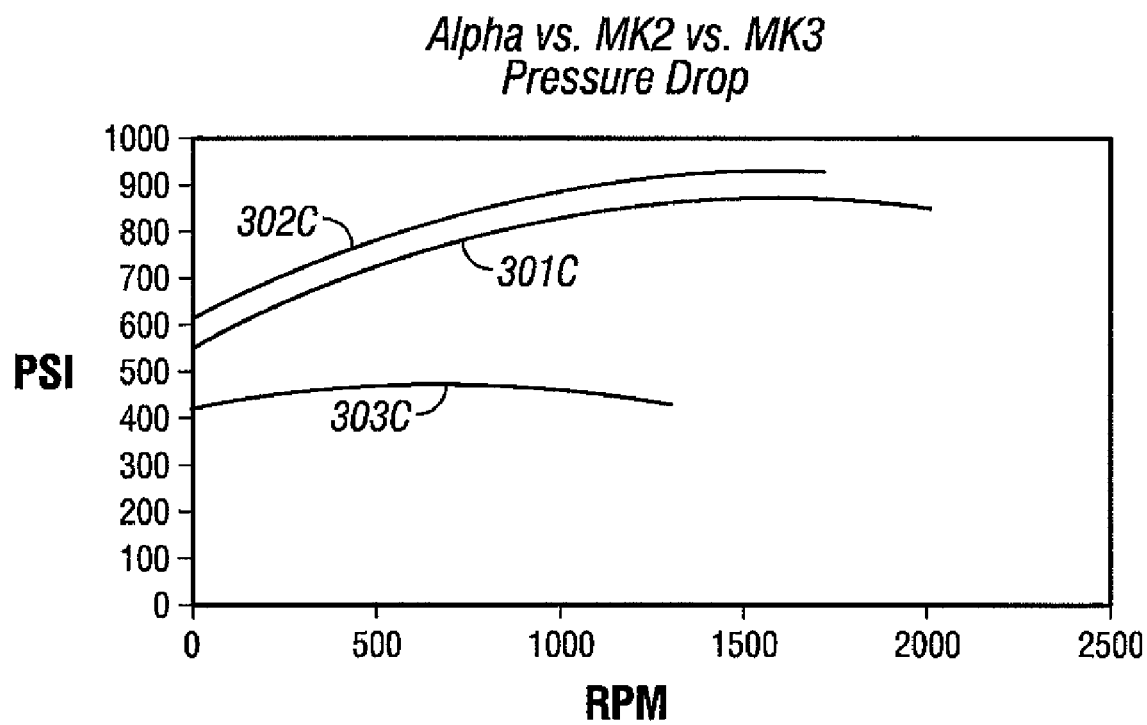
FIG. 7B shows a chart of pressure drop versus rotational speed for two prior art stages compared to a stage in accordance with an embodiment of the present invention.
Figure 7C:
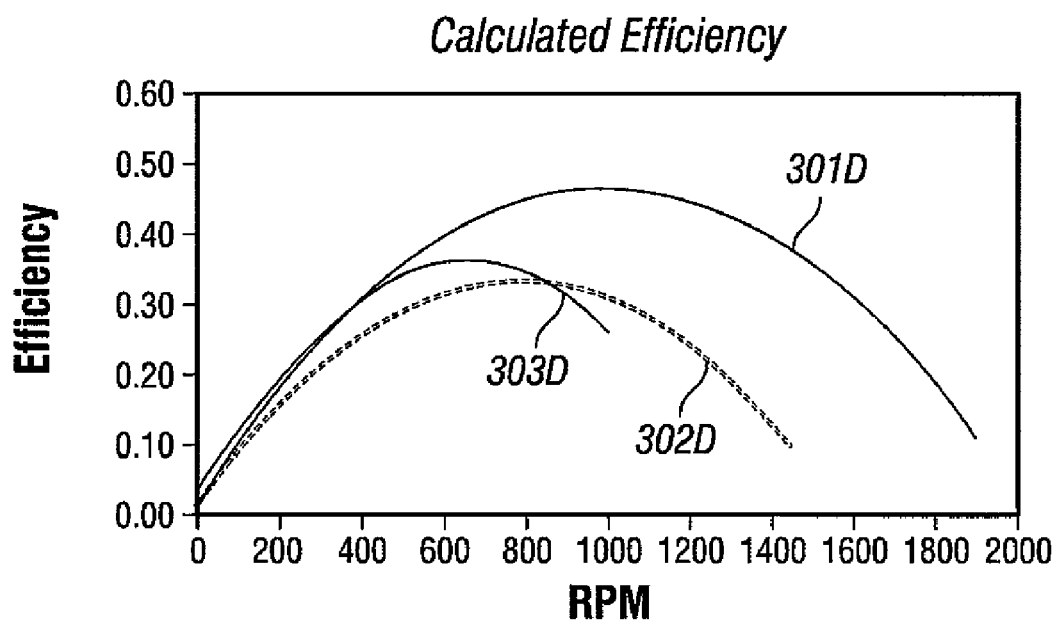
FIG. 7C shows a chart of calculated efficiency versus rotational speed for two prior art stages compared to a stage in accordance with an embodiment of the present invention.

FIGS. 7A-C show graphs of test results for two prior art stages (a MK2 and a MK3 manufactured by Smith International, Inc) compared to a stage (Alpha) in accordance with an embodiment of the present invention. As a control, the same bearing section was used for each test and each stage was for a 6⅝ inch (16.8 centimeters) turbodrill. To perform the tests, water having a density of 8.34 pounds per gallon (999 kg per meter^3) was flowed through the stages at 350 gallons per minute (22 liters per second). A brake was gradually applied to the turbodrill shaft while torque, RPM, and pressure drop were measured and recorded. As shown in FIG. 7A, the Alpha torque 301B and power 301A was noticeably higher than both the MK3 torque 302B and power 302A and MK2 torque 303B and power 303A. In addition to the increased torque and power exhibited by the Alpha, the Alpha power 301A was a significantly broader curve. A broader power curve allows for greater flexibility in customizing RPM based on a particular drill bit and formation, while still operating the turbodrill in a strong portion of the power curve. As shown in FIG. 7B, while generating the increased torque and horsepower, the Alpha had a lower pressure drop 301C than the MK3 pressure drop 301C, but higher than the MK2 pressure drop 303C.

The results shown in FIGS. 7A and 7B were used to calculate efficiency using the equation shown below. As shown in FIG. 7C, the Alpha efficiency 301D was greater than the MK2 efficiency 303D and MK3 efficiency 302D for almost the full RPM range.

$$\text{Efficiency} = \frac{\text{Power} * 1714}{\Delta P * 350} \qquad \text{Equation 11}$$

As discussed above, a high reaction results in increased thrust. In embodiments of the present invention with a reduced reaction, the decreased thrust reduces the axial load on the bearings in the turbodrill. Without being bound to any particular theory, efficiency improvements may result at least in part from the decreased thrust. For one reason, thrust is wasted energy in a turbodrill because it is absorbed by bearings and does not contribute to the rotation of the attached drill bit. Further, reduced axial load in the bearings reduces frictional force, thereby resulting in less resistance to the rotation of the shaft.

Another advantage that may be achieved in embodiments of the present invention relates to tool length. It is generally desirable to decrease the length of a turbodrill. In some embodiments of the present invention, improved stages allow for a decreased overall length of the turbodrill, while providing equal or greater power and torque. Because of improvements to the stages, a reduced number of stages may be used in turbodrills in accordance with some embodiments of the present invention. The reduction in stages allows for both a reduction in production costs, as well as a substantial reduction in the length of the turbodrill while obtaining a turbodrill with comparable power to those of the prior art. In some embodiments the length of the turbodrill may be reduced by about 10 to 30 percent. In other embodiments, the length of the turbodrill may be reduced by more than 50 percent.

Some embodiments may be designed to have a greater pressure drop for a selected flow rate to yield greater power. Embodiments of the present invention may be designed to increase the power for a selected flow rate. This allows for an overall greater power to be achieved for the same flow rate.

Some embodiments may have rotor vanes in which the sum of inlet and outlet angles is substantially less than 120 degrees, while having improved power. Generally, prior art blades having a higher sum of the inlet and outlet angles produce greater power. However, turbodrills designed using the disclosed methods have been able to as much as quadruple power while having a sum of inlet and outlet angles that is less than 100 degrees.

Generally, low power rotor vanes exhibit greater efficiency than higher power rotor vanes. Embodiments of the present invention have been found to increase power, while having equal or greater efficiency than prior art rotor vanes producing less power.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A turbodrill comprising:
   a connection on an upper end adapted to connect to a drill string;
   a connection on a lower end adapted to connect to a drill bit; and at least one stage comprising,
a stator blade having a plurality of stator vanes spaced around a circumference of the stator blade, and
a rotor blade having a plurality of rotor vanes spaced around a circumference of the rotor blade, wherein the stator vanes and rotor vanes are asymmetric relative to each other,
wherein a reaction of the rotor blade is less than about 50 percent.

2. The turbodrill of claim 1, wherein the plurality of rotor vanes have an aspect ratio between about 0.7 and about 1.5.

3. The turbodrill of claim 1, wherein the plurality of rotor vanes have an aspect ratio between about 0.9 and 1.1.

4. The turbodrill of claim 1, wherein the reaction of the rotor blade is between about 20 percent and 35 percent.

5. The turbodrill of claim 4, wherein a reaction of the stator blade is between about 65 percent and 80 percent.

6. The turbodrill of claim 1, wherein the stator blade and the rotor blade have a stagger angle ratio between about 2 to 1 and 3 to 1.

7. The turbodrill of claim 6, wherein the stagger angle ratio is about 2.5 to 1.

8. The turbodrill of claim 1, wherein the turbodrill is a direct drive turbodrill.

9. The turbodrill of claim 8, wherein the turbodrill comprises less than 57 stages.

10. The turbodrill of claim 1, wherein the at least one stage has an operating pressure drop of at least about 25 psi.

11. The turbodrill of claim 10, wherein the turbodrill comprises less than 90 stages.

12. A turbodrill comprising:
a connection on an upper end adapted to connect to a drill string;
a connection on a lower end adapted to connect to a drill bit; and
at least one stage comprising,
a stator blade having a plurality of stator vanes spaced around a circumference of the stator blade, and
a rotor blade having a plurality of rotor vanes spaced around a circumference of the rotor blade, wherein the stator vanes and rotor vanes are asymmetric relative to each other,
wherein each stage has an operating pressure drop of at least about 25 psi,
wherein the turbodrill is a direct drive turbodrill.

13. The turbodrill of claim 12, wherein the turbodrill comprises less than 90 stages.

14. The turbodrill of claim 12, wherein the turbodrill comprises less than 57 stages.

15. The turbodrill of claim 12, wherein each stage has an operating pressure drop of at least 27 psi.

16. The turbodrill of claim 12, wherein each stage has an operating pressure drop of at least 30 psi.

* * * * *